United States Patent
Suya

[11] Patent Number: 6,029,601
[45] Date of Patent: Feb. 29, 2000

[54] THAWING INDICATION MARKER FOR FROZEN FOOD

[75] Inventor: Hachiro Suya, Kanagawa, Japan

[73] Assignee: Nakagawa Chemical Co., Ltd., Tokyo, Japan

[21] Appl. No.: 08/997,002

[22] Filed: Dec. 23, 1997

[30] Foreign Application Priority Data

May 14, 1997 [JP] Japan .................................... 9-124046

[51] Int. Cl.[7] .............................. G01K 1/02; G01K 11/00
[52] U.S. Cl. .............................. 116/217; 62/130; 374/160
[58] Field of Search ............................ 116/217; 374/160; 62/130

[56] References Cited

U.S. PATENT DOCUMENTS

Re. 25,499 12/1963 Fenity et al. ..................... 116/217 X
2,662,018 12/1953 Smith ............................... 116/217 X
5,695,284 12/1997 Waters ............................. 116/217 X

*Primary Examiner*—William Wayner
*Attorney, Agent, or Firm*—McAulay Nissen Goldberg Kiel & Hand, LLP

[57] ABSTRACT

A thawing indication marker for frozen food is disclosed for determining whether or not a frozen food has been thawed. It comprises a tube of an elastic transparent resin, the tube being bent at its center to form two separate containers. One container contains a colored gel-like liquid prepared from an edible starch and food color and the other container contains a gel-like liquid also prepared from an edible starch and food color which is different from the first food color. The marker is used by straightening the bent portion and applying it to frozen food. If the food undergoes thawing, as a result of being subjected to a temperature above the freezing point of water, the gels become less viscous and can intermingle. By virtue of the color difference, one can observe whether or not any intermingling of the two different colored gels has occurred and therefore, whether or not the food stuff has been subjected to non-thawing conditions.

19 Claims, 4 Drawing Sheets

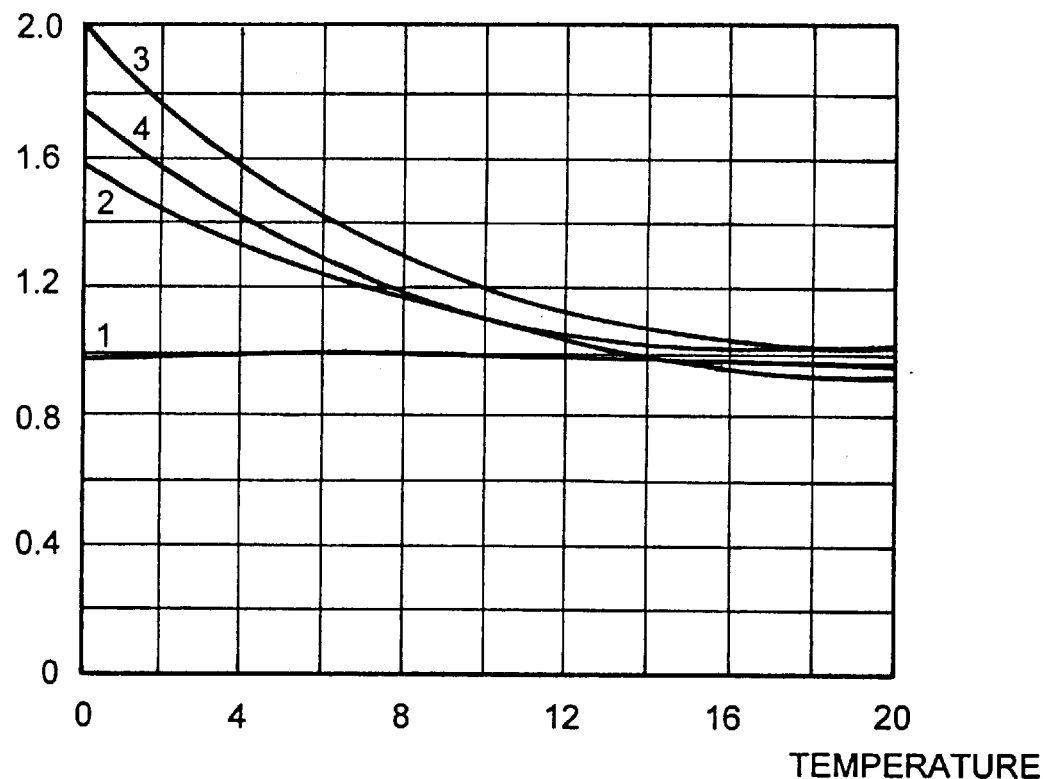
1 WATER
2 A VISCOUS LIQUID CONTAINING 1g OF A STARCH
3 A VISCOUS LIQUID CONTAINING 2g OF A STARCH
4 A VISCOUS LIQUID CONTAINING 2g OF A STARCH AND 0.1g OF A SURFACTANT
F I G. 11

THAWING INDICATION MARKER FOR FROZEN FOOD

BACKGROUND OF THE INVENTION

1. Field of the Invention

The present invention relates to a thawing indication marker to be used on a frozen food, in particular, to a thawing indication marker for a frozen food, capable of easily judging whether or not the frozen food has been thawed.

2. Description of the Related Art

Conventionally, most of frozen foods including fishery products are frozen at a low temperature of −10° C. to −40° C. with various kinds of freezing equipment so that the freshness of the frozen foods can be maintained for a long time until the foods are thawed.

However, a problem may arise in that these frozen foods, which should be treated in a temperature not more than 0° C., are treated in an atmosphere (environment) over 0° C. due to mix-up of taking frozen foods for cold-storage goods, etc., and being left without recognizing so that the frozen foods are thawed and the freshness thereof is ruined to lose the merchandise value. That is, the frozen foods, which have been thawed cannot regain the initial freshness even though they are frozen again, and thus the merchandise value of once thawed frozen foods declines.

A judging means capable of easily and accurately indicating the freshness of frozen foods, that is, whether or not the frozen foods are maintained in the initial frozen state, and whether or not the frozen foods have been thawed in the intermediate state, has been called for.

SUMMARY OF THE INVENTION

Accordingly, in order to meet the above-mentioned demand, a first object of the present invention is to provide a thawing indication marker to be attached on a package of a frozen food, capable of judging accurately whether or not the frozen food has been thawed by causing the color change subject to the exposure to a thawing atmosphere of 0° C. or more without the risk of a hazard in terms of food sanitation.

A second object of the present invention is to allow the thawing indication marker to be attached on a frozen food easily and securely so that the thawing indication marker is maintained securely on the frozen food during the transportation from the manufacturer to the consumer.

In order to achieve the above-mentioned first object, a thawing indication marker for a frozen food according to one aspect of the present invention comprises a tube made of an elastic transparent resin, with the both ends open, being bent by half so as to form container portions at both sides with respect to the bent portion, having one container portion being filled with a colored jelly-like liquid prepared from an edible starch and a food color applied with a heat treatment for jellying, and sealed, and the other container portion being filled with another colored jelly-like liquid prepared from an edible starch and a food color different from the above-mentioned food color, applied with a heat treatment for jellying, and sealed.

In order to achieve the above-mentioned second object, a thawing indication marker for a frozen food according to a second aspect of the present invention further comprises an adhering means for attaching the tube on a food provided at the outer side surface of the elastic transparent resin tube in addition to claim 1.

BRIEF DESCRIPTION OF THE DRAWINGS

FIG. 11 is a graph showing the relationship between the viscosity index of jelly-like liquids and the temperature.

DESCRIPTION OF THE PREFERRED EMBODIMENTS

Hereinafter an embodiment of the present invention will be described with reference to accompanied drawings. The configuration of a thawing indication marker of this embodiment, will be explained.

Numeral 1 denotes a tube made from a transparent resin, having a diameter of about 10 mm. The tube 1 is made of a known elastic and bendable polyethylene resin material used as a watering hose.

Numeral 2 denotes a band-like base paper to be attached on the outer side surface of the above-mentioned tube 1 along the longitudinal direction. The base paper 2 is applied with an adhesive 2A on one side for adhering to the tube 1, and is further applied with an adhesive 2B on the other side at the both ends for adhering to a frozen matter (not illustrated) such as a frozen food.

Figure 1:
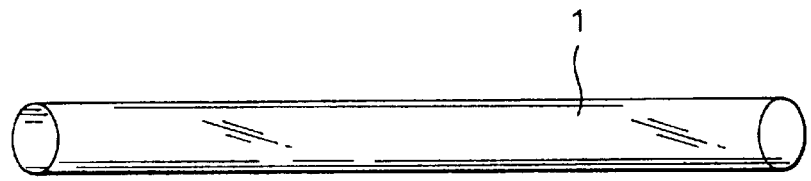
FIG. 1 is a perspective view of a tube used in a thawing indication marker of the present invention.
Figure 2:
FIG. 2 is a side view of a base paper used in the thawing indication marker of the present invention.
Figure 3:
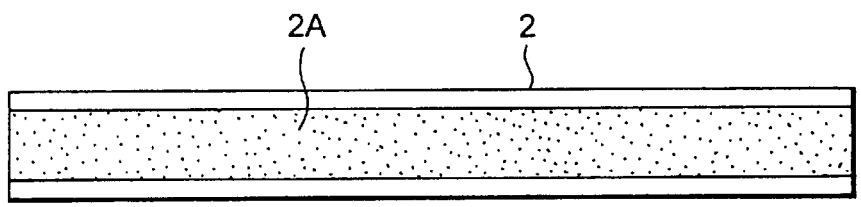
FIG. 3 is a front view of the base paper used in the thawing indication marker of the present invention.
Figure 4:
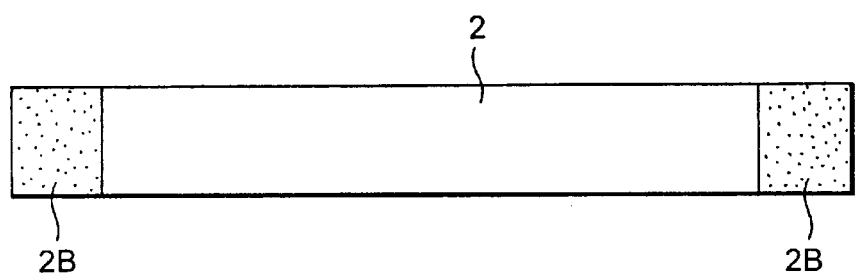
FIG. 4 is a rear view of the base paper used in the thawing indication marker of the present invention.
Figure 5:
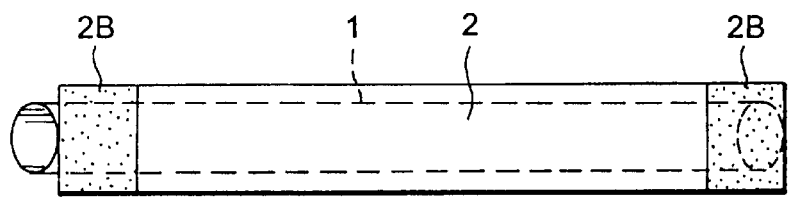
FIG. 5 is a perspective view showing the state of combining the tube and the base paper.
Figure 6A:
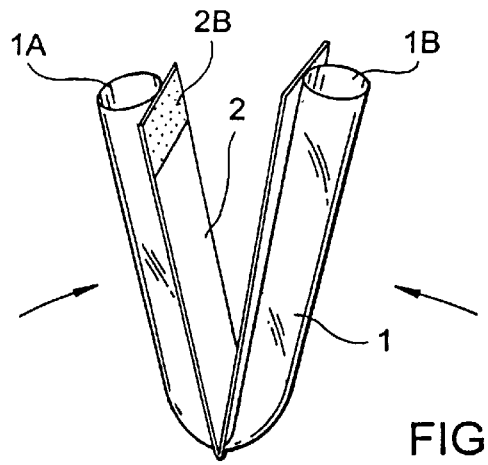
FIGS. 6A, 6B are perspective views showing processes of forming the thawing indication marker of the present invention.
Figure 6B:
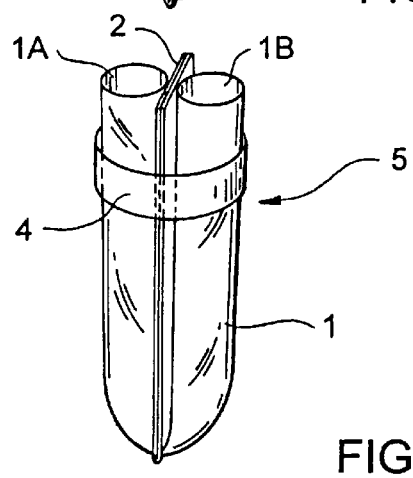
Figure 7:
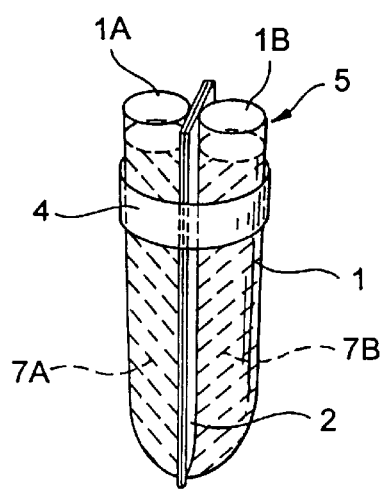
FIG. 7 is a perspective view of the thawing indication marker of the present invention being filled with jelly-like liquids.

For forming a thawing indication marker 3 with the tube 1 and the base paper 2, the base paper 2 is attached onto the outer side surface of the tube 1 cut by a predetermined length with the adhesive 2A on the base paper 2 as shown in FIG. 5. A substantially middle position of the tube 1 and the base paper 2 is bent as shown in FIG. 6. In order to maintain the bent state, a taping 4 is further applied so as to form a container 5 having a substantially U-shaped side view.

The bent portion of the tube 1 bent with the base paper 2 is flattened so as to divide the tube 1 into a pair of right and left container portions 1A and 1B, prohibiting the passage of the material to be filled inside. Jelly-like liquids to provide a marker will be sealed in the separate container portions 1A and 1B. A jelly-like liquid can be prepared with it starch available on market for the edible use such as a dogtooth violet starch, dissolved with the ratio of 1 g with respect to 10 ml drinkable water, with 100 ml of hot water of 95° C. to 100° C. added thereto and stirred so as to produce a jelly-like liquid having viscosity (sol).

Certain amounts of different food colors (such as red and green colors) are added to the jelly-like liquids prepared as mentioned above and divided by half, respectively, so as to produce two kinds of colored jelly-like liquids having different colors.

As another example of the production method of a jelly-like liquid, it is also possible to obtain a jelly-like liquid by adding 1 g of a starch and an optional amount of (such as 0.5 g) a food color to 110 ml of drinkable water and heating while stirring. However, a jelly-like liquid can be obtained more easily by the above-mentioned method.

Figure 8:
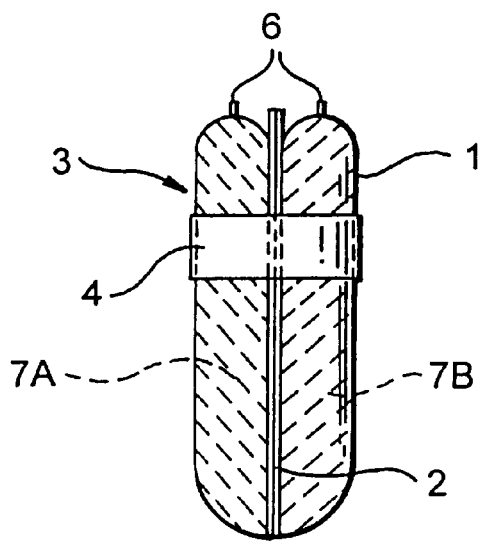
FIG. 8 is a side view showing the completed state of the thawing indication marker of the present invention.

A jelly-like liquid 7A, one of the above-mentioned two kinds of jelly-like liquids is filled in the container portion 1A of the container 5, and the other jelly-like liquid 7B is filled in the other container portion 1B. The container portion 1A and the container portion 1B are separated only by bending the border part of the container 5, however, since the jelly-like liquids filled in the both container portions 1A and 1B are viscous, the jelly-like liquids in the container portions 1A and 1B maintain each color independently without mixing with each other when the tube 1 is in the state of being bent. For this purpose, it is desirable that the jelly-like liquids 7A, 7B have a viscosity from 1500 to 8000, more preferably from 2000 to 5000. By heat-sealing 6 the opening portions of the container portions 1A, 1B so as to seal the jelly-like liquids 7A, 7B in the container portions 1A, 1B, a thawing indication marker 3 shown in FIG. 8 is completed.

Figure 9:
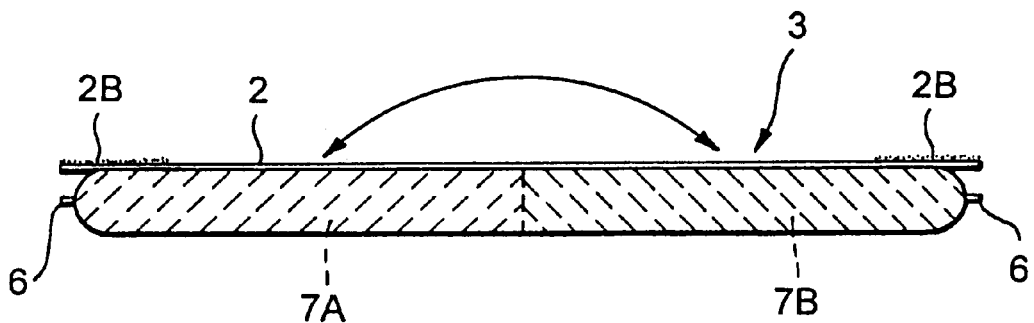
FIG. 9 is a side view of the thawing indication marker of the present invention being expanded.
Figure 10:
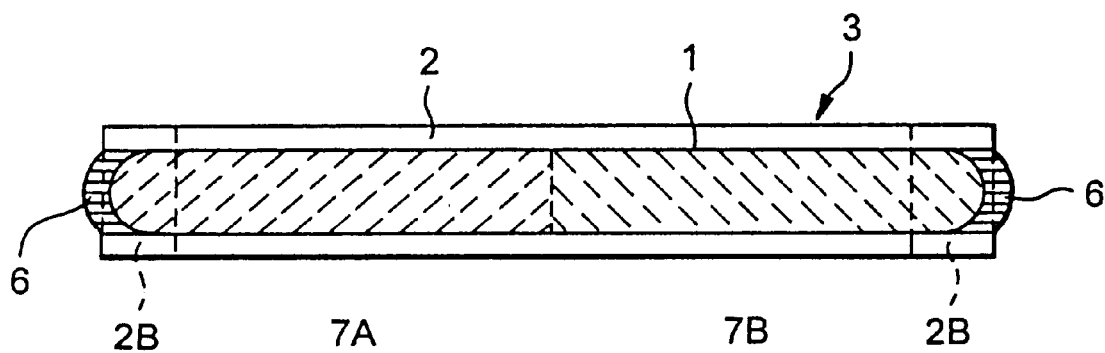
FIG. 10 is a plan view of the thawing indication marker of the present invention being expanded.

The thawing indication marker 3 produced accordingly is traded by a dealer of frozen foods, and used such that a taping 4 is removed by the dealer to expand the thawing indication marker 3 from the state being bent in a U-shape to a bar-like shape as shown in FIGS. 9 and 10 so as to be attached on a frozen food or a food to be frozen (not illustrated) with the adhesive 2B on the base paper 2. Even if the thawing indication marker is expanded like a bar, since the jelly-like liquids of different colors 7A, 7B filled in the tubes 1A, 1B are viscous, the jelly-like liquids of different colors 7A, 7B do not mix with each other immediately and thus they are maintained separately in the tube 1. The food attached with the thawing indication marker 3 is frozen immediately with the thawing indication marker 3 so as to be preserved (stored) as a frozen food.

In the case the frozen food attached with the thawing indication marker 3 is thawed by being left in an ordinary temperature or by being heated, the viscosity of the jelly-like liquids 7A, 7B in the tube 1 of the thawing indication marker 3 attached on the frozen food lowers according to the thawing by the above-mentioned temperature rise. That is, since the starch tissue has been destroyed due to the volume change of the moisture contained in the starch tissue sealed in the tube, and the viscosity of the above-mentioned jelly-like liquids 7A, 7B is lost (weakened), the viscosity of the jelly-like liquids in the tube 1 declines at the time of thawing such that the jelly-like liquids of red and green colors 7A, 7B filled in the container portions 1A, 1B mix with each other to have a mixed color as a result of mixing. Therefore, judgment can be made by visual observation of the color change on whether or not the frozen food has been thawed. Even if the once thawed food is frozen again with the above-mentioned thawing indication marker, since the thawing indication marker experienced color change stays in the mixed color so that it can be recognized that the frozen food has been thawed.

FIG. 11 shows that the viscosity of jelly-like liquids prepared from a starch as mentioned above have different characteristics before and after freezing.

That is, the graph of FIG. 11 shows the relationship between the temperature rise and the viscosity change in viscous liquids being left in a 23° C. room temperature with the viscosity index of water at 4° C. is 1. It was confirmed that the viscosity change is accelerated by adding a plant surfactant in a viscous liquid beforehand.

Therefore, the time needed in the change from the two colors into a mixed color after thawing can be adjusted by the starch concentration of a viscous liquid or by the use of a surfactant.

Furthermore, frozen foods to be attached with the above-mentioned thawing indication marker 3 vary in terms of the size, and thus the thawing time thereof varies accordingly. Therefore, the thawing time needs to be adjusted according to the size of the frozen material by the starch concentration in a viscous liquid used in the above-mentioned thawing indication marker, that is, variation of the viscosity of a jelly.

The below-mentioned example shows the time needed in dissolving ice of a 1 cm$^3$ volume made from a viscous liquid frozen at −20° C., left in a 23° C. room temperature to become liquid.

Water only 30 minutes 1 g of a starch and 110 ml of water 35 minutes 2 g of a starch and 110 ml of water 38 minutes As heretofore mentioned, according to a thawing indication marker for a frozen food of the present invention, since jelly-like liquids of different kinds sealed separately in a tube are mixed to cause color change if the frozen food attached with the thawing indication marker is thawed, the judgment can be made quite easily by the color change of the thawing marker concerning whether or not the frozen food has been thawed. Therefore, it is excellently practical as a marker for confirming the freshness of a frozen food.

Further, since the material (a jelly-like liquid) used in a thawing indication marker of the present invention comprises safe materials in terms of food sanitation, such as an edible starch, a food color and drinkable water, even if the above-mentioned jelly-like liquid contacts with a food, it is safe in terms of food sanitation.

Moreover, since a thawing indication marker of the present invention has a configuration where a jelly-like liquid comprising a mixture of a starch and a color is sealed in a resin tube, a product can be provided at an extremely low cost, and thus it is advantageous in terms of productivity and economy.

What is claimed is:

1. A thawing indication marker comprising:

a sealed container formed from an elastic transparent resin;

a gel in the sealed container, the gel comprising liquid, drinkable water and an edible starch;

a first colorant in a first distinct region of the gel; and a second colorant in a second distinct region of the gel, wherein the gel has a liquid viscosity which prevents the mixing of the first and second colorants during a time interval between applying the thawing indication marker to an object and freezing the object with the applied thawing indication marker.

2. The thawing indication marker of claim 1, further comprising adhering means for attaching the sealed container to the object.

3. The thawing indication marker of claim 1, wherein the gel completely fills the sealed container.

4. The thawing indication marker of claim 1, wherein the gel, upon being frozen and then thawed, has a thawed viscosity which allows the mixing of the first and second colorants.

5. The thawing indication marker of claim 4, wherein the gel further comprises a means of adjusting the thawed viscosity.

6. The thawing indication marker of claim 5, wherein the means of adjusting the thawed viscosity comprises a surfactant.

7. The thawing indication marker of claim 6, wherein the surfactant is derived from a plant.

8. A thawing indication marker comprising:
- a sealed cylindrical container bent substantially in the middle to form a first container portion and a second container portion divided by the bend;
- a first gel comprising drinkable liquid water, an edible starch and a first colorant in the first container portion; and
- a second gel comprising drink able liquid water, an edible starch and a second colorant in the second container portion, wherein the bend prevents the passage of the first gel into the second container portion and the second gel into the first container portion, and the first and second gels have a liquid viscosity which prevents the mixing of the first and second colorants for a time interval sufficient for unbending the sealed cylindrical container, applying of the thawing indication marker to an object and freezing the object with the applied thawing indication marker.

9. The thawing indication marker of claim 8, further comprising adhering means for attaching the sealed cylindrical container to the object.

10. The thawing indication marker of claim 8, wherein the first and second gels completely fill the sealed cylindrical container.

11. The thawing indication marker of claim 8, wherein the first and second gels, upon being frozen and then thawed, have a thawed viscosity which allows the mixing of the first and second colorants in the unbent sealed cylindrical container.

12. The thawing indication marker of claim 11, wherein the first and second gels further comprise a means of adjusting the thawed viscosity.

13. The thawing indication marker of claim 12, wherein the means of adjusting the thawed viscosity comprises a surfactant.

14. The thawing indication marker of claim 13, wherein the surfactant is derived from a plant.

15. A process for producing a thawing indication marker comprising the steps of:
- providing a tube of elastic transparent resin open at both ends;
- bending the tube to define a first container portion and a second container portion;
- filling the first container portion with a first gel comprising drinkable liquid water, an edible starch and a first colorant;
- filling the second container portion with a second gel comprising drinkable liquid water, and edible starch and a second colorant; and
- sealing both ends of the filled tube.

16. The process of claim 15, further comprising the step of applying to an outer surface of the tube an adhering means for attaching the tube to an object.

17. The process of claim 15, further comprising the step of applying to the tube means to maintain the bent shape.

18. The process of claim 17, wherein the means to maintain the bent shape is tape.

19. The process of claim 15, further comprising the step of unbending the sealed tube.

* * * * *